United States Patent
Arihara

(10) Patent No.: US 7,309,153 B2
(45) Date of Patent: Dec. 18, 2007

(54) SURFACE LIGHT SOURCE DEVICE AND DISPLAY

(75) Inventor: Tsutomu Arihara, Saitama (JP)

(73) Assignee: Enplas Corporation, Saitama (JP)

( * ) Notice: Subject to any disclaimer, the term of this patent is extended or adjusted under 35 U.S.C. 154(b) by 243 days.

(21) Appl. No.: 11/290,990

(22) Filed: Dec. 1, 2005

(65) Prior Publication Data

US 2006/0164864 A1 Jul. 27, 2006

(30) Foreign Application Priority Data

Dec. 1, 2004 (JP) ............................. 2004-348378

(51) Int. Cl.
*F21V 7/04* (2006.01)
(52) U.S. Cl. ...................... 362/615; 362/621; 362/617; 362/620; 362/626; 349/65; 349/62
(58) Field of Classification Search ........ 362/615–616, 362/619–620, 625–626, 617, 621; 349/62–63, 349/65
See application file for complete search history.

(56) References Cited

U.S. PATENT DOCUMENTS 7,042,534 B2 * 5/2006 Fujishiro .................... 362/620

FOREIGN PATENT DOCUMENTS

| JP | 5-25426 | 4/1993 |
|---|---|---|
| JP | 2002-196151 | 7/2002 |

* cited by examiner

*Primary Examiner*—Jong-Suk (James) Lee
*Assistant Examiner*—Robert May
(74) *Attorney, Agent, or Firm*—Staas & Halsey LLP

(57) ABSTRACT

Light guide plate 4 is provided with an emission-directivity-giving-means (such as projection rows on a back face) to modify directivity of emission from emission face 10. L light control member 11 disposed on emission face 10 is provided with a plurality of prismatic projection rows 15 running in a direction inclined anticlockwise (or clockwise). Each of incidence control portions 12 formed on incidence face 5 has an asymmetric configuration providing first and second side face (convex face) 13, 14 different from each other in curvature. Light emitted by LED 6 enters into light guide plate 4 through each incidence control portion 12, generating inner propagation light which spreads like a sector having a center axis inclined clockwise (or anticlockwise). The first and second side faces may have other configurations such as "concave faces different from each other in curvature", "flat slopes different from each other in inclination" or "flat face and curved face".

5 Claims, 13 Drawing Sheets

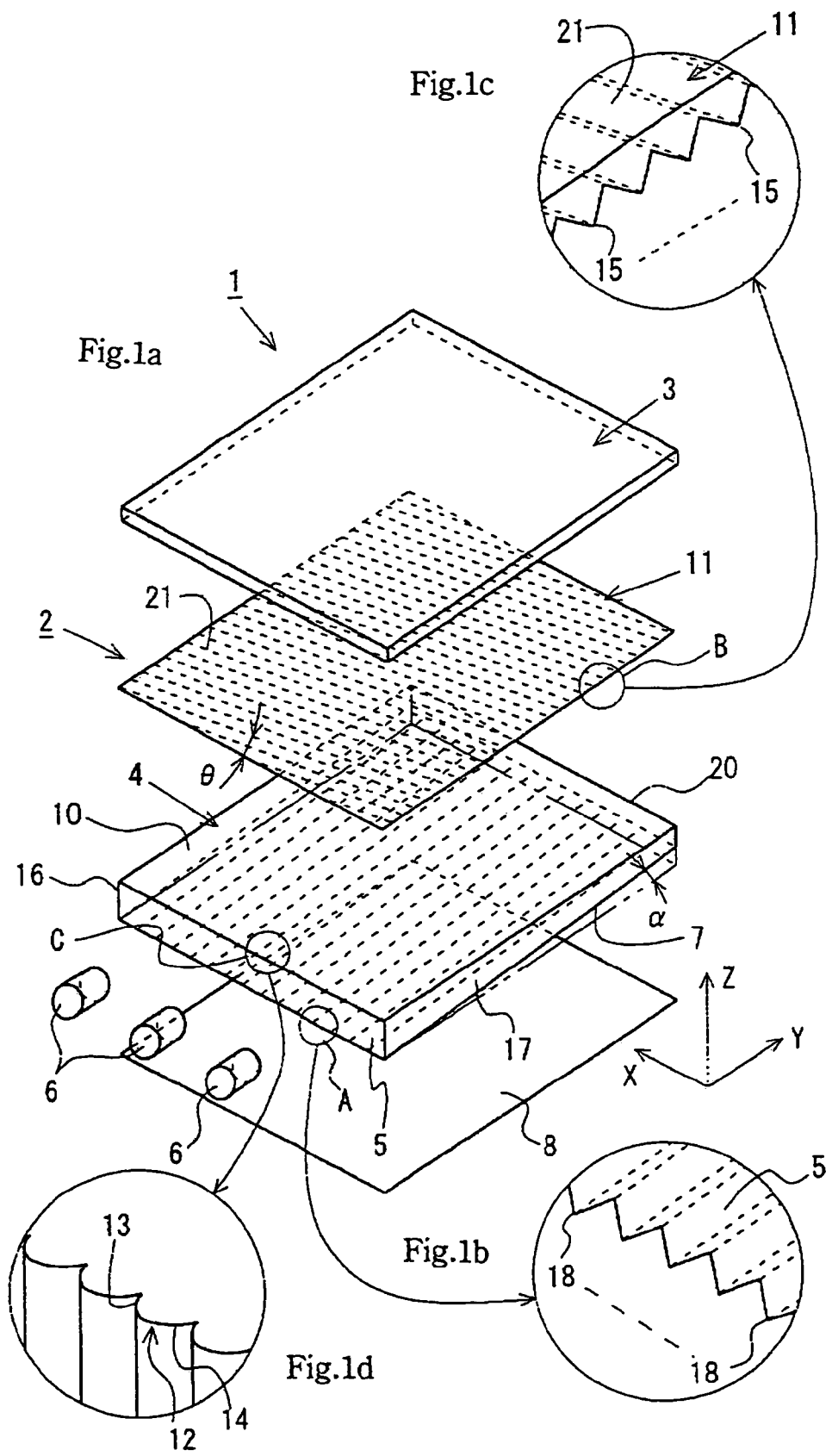

NORMAL DIRECTION
OF INCIDENCE FACE

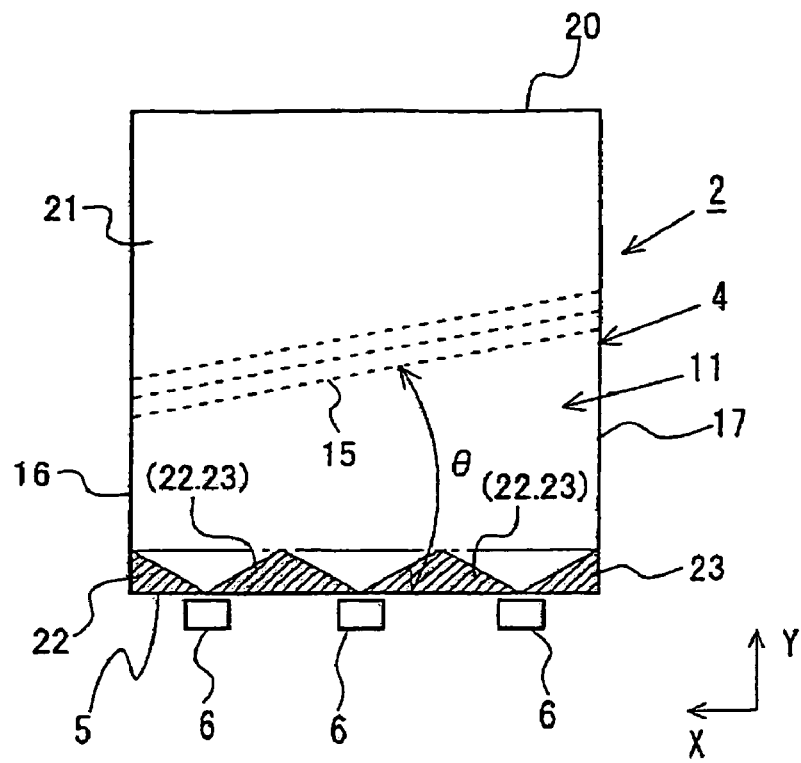
Fig.4a
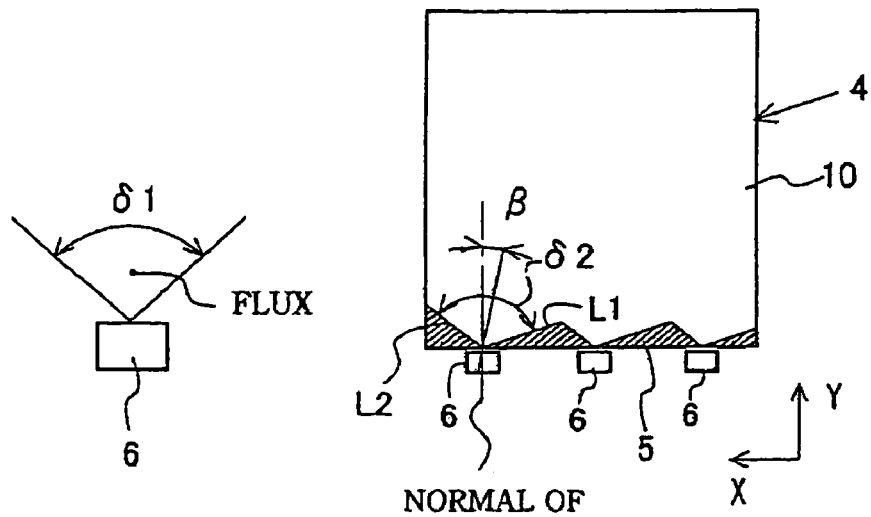
Fig.4b
Fig.4c

NORMAL DIRECTION
OF INCIDENCE FACE

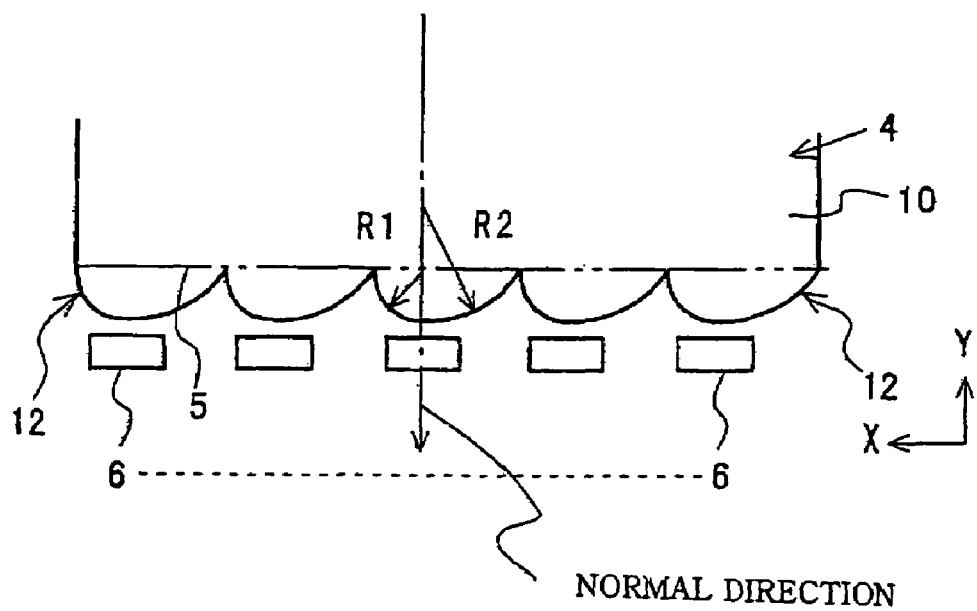
Fig.12    NORMAL DIRECTION OF INCIDENCE FACE
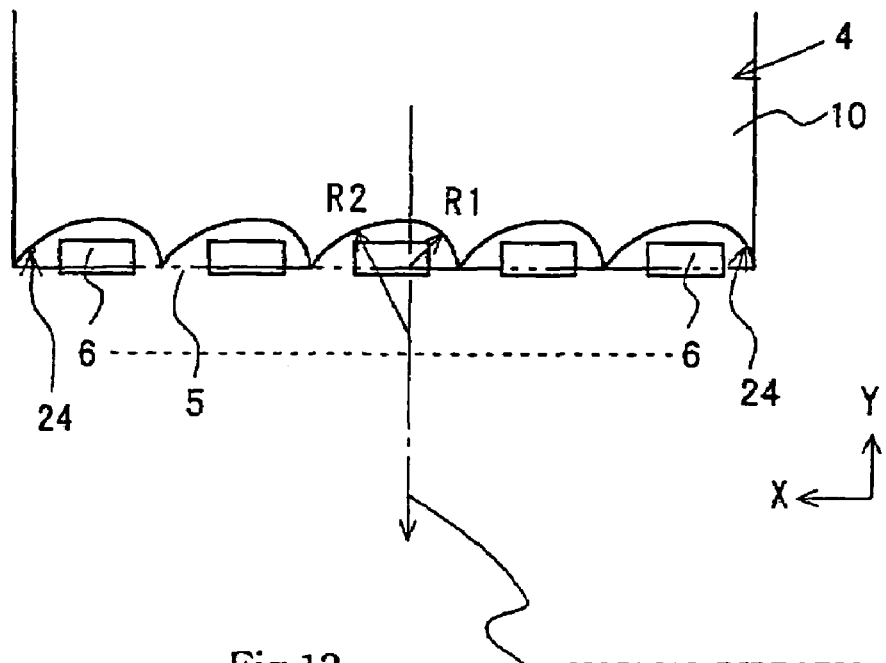
Fig.13    NORMAL DIRECTION OF INCIDENCE FACE

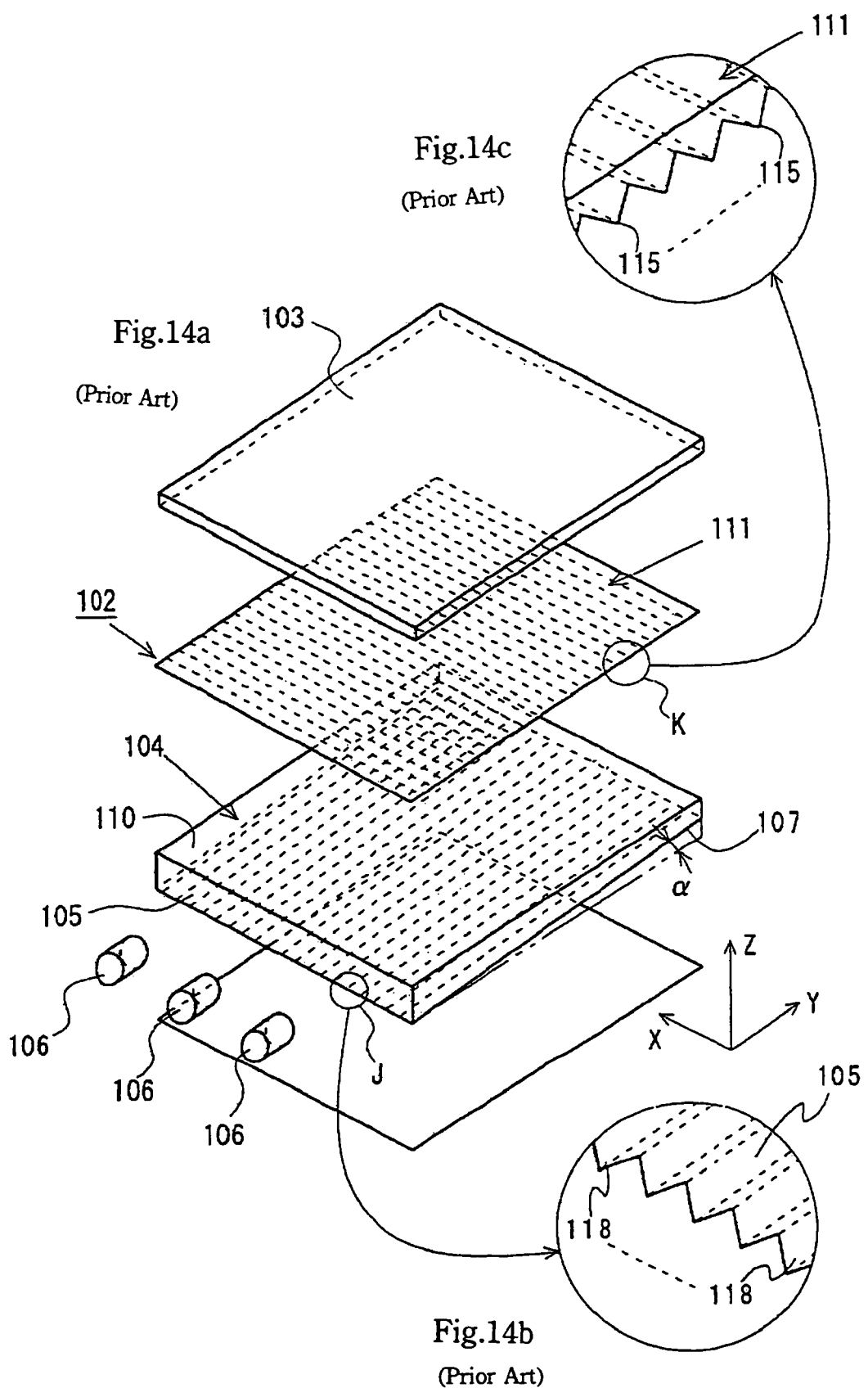

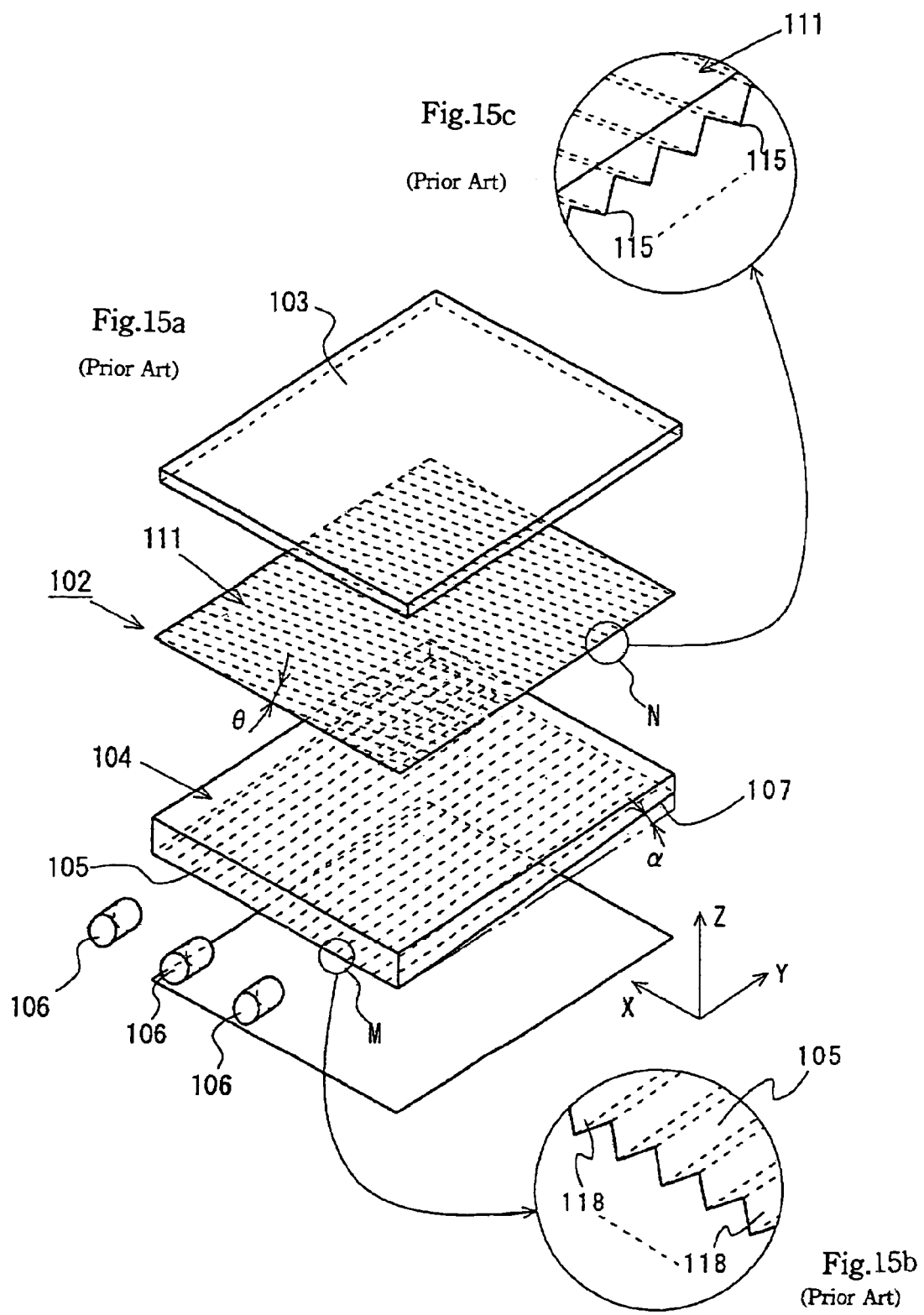

NORMAL DIRECTION
OF INCIDENCE FACE

SURFACE LIGHT SOURCE DEVICE AND DISPLAY

BACKGROUND

1. Field of Invention

The present invention relates to a surface light source device used for backlighting an object-to-be-illuminated such as LCD panel or advertising panel, for example, in portable telephones, portable mobile terminal devices, car navigation devices, personal computers, video cameras, digital still cameras, electronic pocket note books or LCD-TV sets, and to displays provided with the surface light source device.

2. Related Arts

FIG. 14 shows an example (first prior art) of conventional surface light source device including a light guide plate, primary light source supplying light to the light guide plate and light control member (for example, prism sheet) disposed along an emission face of the light guide plate as basic components, wherein the surface light source device is used in a conventional image display.

Referring to FIG. 14, surface light source device 102 is arranged for backlighting LCD panel (image displaying panel) 103 of personal computer or the like. A side end face (minor face) of light guide plate 104 provides incidence face 105 receiving light from LED (primary light source) 106. A major face provides an emission face 110 for emitting light. Light control member 111 is interposed between emission face 110 of light guide plate 104 and LCD panel 103. Light emitted from emission face 110 is transmitted and redirected by light control member 111 as to come close angularly to a generally frontal direction (normal direction of emission face 110 (Z-direction), illumination LCD panel 103.

Back face 107 of light guide plate 104 is provided with a great number of prismatic projection rows 118 each of which has a triangle-like cross section. Projection rows 118 run in a direction (Y-direction) perpendicular to incidence face 105, performing a light deflecting function. That is, projection rows 118 deflect light propagating within light guide plate 104, causing the light to have a direction near to a normal direction of emission face 110 in an imaginary plane parallel to incidence face 105 and perpendicular emission face 110.

On the other hand, light control member 111 has an inner face (i.e. a face directed to emission face 110) provided with a great number of prismatic projection rows 115 each of which has a triangle-like cross section. Projection rows 115 run generally in a direction (X-direction) parallel to incidence face 105, performing another light deflecting function. That is, projection rows 115 deflect light emitted from emission-face 110, causing the emitted light to have a direction near to a frontal direction (Z-direction) of emission face 110 in an imaginary plane perpendicular to incidence face 105 and perpendicular emission face 110.

As a result, LCD panel 103 is efficiently supplied with light so that incidence occurs to a back face thereof in a generally vertical direction, thereby providing a high display brightness.

However, it is known that image displays of the above type are subject to a problem that stripe pattern like Moire-stripe is apt to appear on a screen of LCD panel 103. Needless to say, such stripe pattern reduces display quality.

FIG. 15 illustrates an example (second prior art) improved to avoid this problem, being disclosed in Document 1 cited below.

As illustrated in FIG. 15, this arrangement employs an improved surface light source device 102. An improved point is that an oblique orientation is applied to prismatic projection rows 115 on light control member 111. In other words, projection rows 115 run in a direction inclined (0°<inclination angle θ<90°) with respect to incidence face 105 of light guide plate 104. Such an inclined orientation gives a reduced tendency of appearance of stripe pattern like Moire-stripe.

Document 2 cited below discloses another improved art (third prior art), being illustrated in FIG. 16. This prior art employs surface light source device 202 having light guide plate 204. Light guide plate 204 has incidence face 205 provided with a plurality of projections 212 or grooves 224 ruining in a thickness direction.

Each projection 212 or groove 224 has a plan-shape (shape as viewed from just above emission face 210 of light guide plate 204) which is symmetric with respect to a normal direction of incidence face 205. Light from LED 206 enters into light guide plate 204 through projections 212 or grooves 224.

This entering involves an angular expansion of light as compared with a case where incidence face 205 were a minor face (namely, neither projections 212 nor grooves 224 are formed).

As a result, an area of a triangle-like dark region (hatched region) appearing on emission face 210 in the vicinity of incidence face 205 is reduced and an effective emission area of light guide plate 204 is enlarged. In addition, a uniformalized emission brightness is provided by emission face 210.

If projections 212 or grooves 224 are formed on incidence face 205 as shown in FIG. 16 is applied to light guide plate 104 of surface light source device 102, Moire pattern is reduced because prismatic projection rows 115 of light control member 111 run in a direction inclined with respect to incidence face 105.

However, there rises a difference in brightness between right-side-end L1 and left-side-end L2 of a sector-like incident light in the vicinity of incidence face 205, as illustrated in FIG. 16. This hinders emission brightness from being uniformalized.

DOCUMENT 1:Jikkai-Hei P-A) 5-25426
DOCUMENT 2:Tokkai (JP-A) 2002-196151

OBJECT AND SUMMARY OF INVENTION

The present invention aims at overcoming the problem of the above prior arts in order to enable an illuminated-object to be supplied with illumination light having a more uniformalized brightness.

First, the present invention is applied to a surface light source device comprising a light guide plate, a primary light source performing light supply to said light guide plate sideways and light control member, said light guide plate having an emission face provided by a major face and an incidence face provided by a side end face extending in a right-and-left direction as viewed from the primary light source, said light control member being disposed along the emission face and deflecting a proceeding direction of light emitted from the emission face as to cause the proceeding direction to come near to a normal direction of the emission face.

According to a feature of the present invention, said light guide plate is provided with an emission-directivity-giving-means giving a directivity to an inner propagation light within the light guide plate so that directivity of emission from the emission face is modified.

In addition, under definition that the normal direction of the emission face is +Z-direction and a direction of said light supply is +Y-direction and an extending direction of said side end face is ±X-direction, said light control member is provided a plurality of prismatic projection rows running in an oblique direction inclined clockwise or anticlockwise with respect to ±X-direction as viewed from +Z-direction side while said incidence face is provided with a plurality of incidence control portions.

Further, each of the incidence control portions has first and second parts providing first and second side faces extending in ±Z-direction, the first side face being left-hand-located (at +X-side) and the second side face being right-hand-located (at −X-side), as vied from −Y-direction side (i.e. primary light source side; in the same way hereafter), and further each of the incidence control portions is configurated asymmetrically with respect to a plane which is perpendicular to ±X-direction and passes a boundary line between said first and second side faces (i.e. YZ-plane, in the same manner hereafter).

This causes an inner propagation light generated when light emitted from said primary light source enters into said light guide plate through each of said incidence control portions to have a sector-like spread, in a plane parallel to said emission face, which has a center axis inclined, with respect to +Y-direction, either anticlockwise under a condition that said oblique direction is inclined clockwise or clockwise under another condition that said oblique direction is inclined anticlockwise.

Said first and second side faces may be "curved faces different from each other in curvature", "flat faces inclined at different inclination angles with respect to ±X-direction", or "a curved face and a flat face". Please note that "curved face" is excluded from "flat face" in the present specification.

The present invention is also applied to a display. That is, any surface light source device as above and an illuminated-member supplied with an output-light of the surface light source device are combined to provide a display in accordance with the present invention. An typical illuminated-member is a LCD-panel. If a LCD-panel is employed, a LCD is provided.

The present invention enables not only illumination light brightness to be uniformalized and Moire pattern to be effectively avoided from appearing on a screen of LCD panel or the like but also a surface light source device to have a large effective light emitting area and a illumination output without unevenness in brightness.

BRIEF DESCRIPTION OF DRAWINGS

FIG. 1a is an exploded perspective view of a surface light source device and a display provided with the same of an embodiment in accordance with the present invention;

FIG. 1b is an enlarged partial view of part A in FIG. 1a;
FIG. 1c is an enlarged partial view of part B in FIG. 1a;
FIG. 1d is an enlarged partial view of part C in FIG. 1a;
FIG. 2a is a plan view of the surface light source device of the embodiment;
FIG. 2b is an enlarged partial view of part E in FIG. 2a;
FIG. 3a is a cross section view along D1-D1 in FIG. 2a;
FIG. 3b is an enlarged partial view of part F in FIG. 3a;

FIG. 4a is a plan view diagram illustrating dark areas appearing in emission of a surface light source device;
FIG. 4b is a plan view illustrating a light flux from LED;
FIG. 4c is a plan view diagram illustrating dark areas appearing in emission of a light guide plate;
FIG. 5 is a plan view diagram illustrating dark areas appearing in emission of an example for comparison employing a light control member (provided with prismatic projection rows running parallel to an incidence face of a light guide plate) different from the light control member employed in the surface light source device shown in FIG. 4a;
FIG. 6b is a partially enlarged view of part G shown in FIG. 6a;
FIG. 9b is a partially enlarged view of part H shown in FIG. 9a;
FIG. 12 is a partially enlarged view of an incidence face and around the same of a light guide plate in accordance with a forth modification of the present invention;
FIG. 13 is a partially enlarged view of an incidence face and around the same of a light guide plate in accordance with a fifth modification of the present invention;
FIG. 14 is an exploded perspective view of a surface light source device (display) in accordance with a first prior art;
FIG. 15 is an exploded perspective view of a surface light source device (display) in accordance with a second prior art;
FIG. 16a is an exploded perspective view of a surface light source device in accordance with a third prior art; and,
FIG. 16b is a partially enlarged view of part Q shown in FIG. 16a.

EMBODIMENT

Figure 2A:
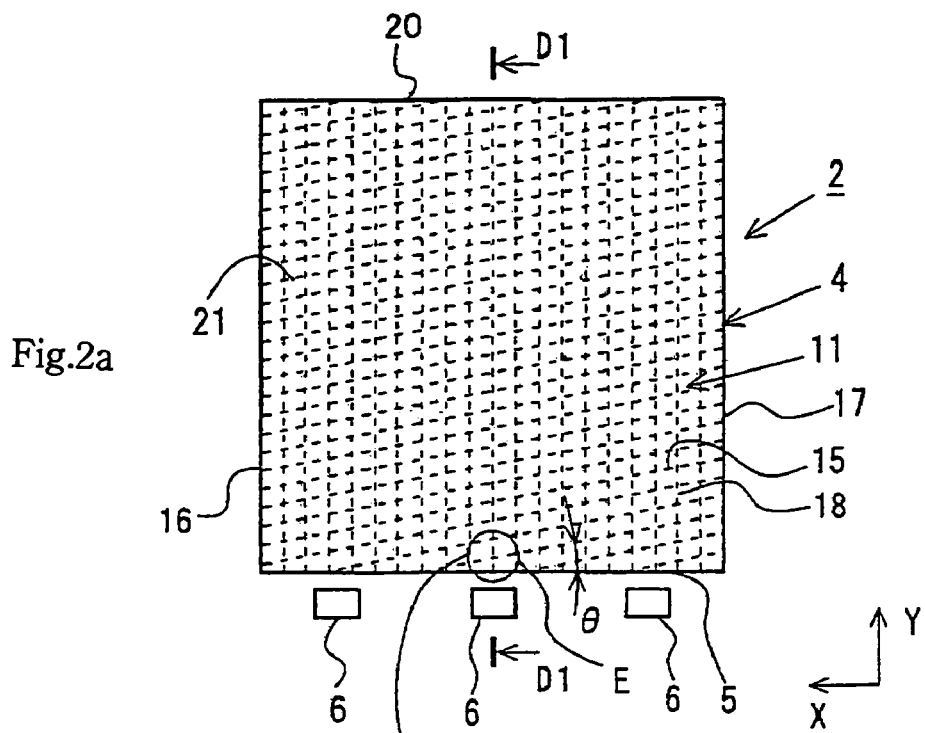
FIG. 2a is an exploded perspective view of a surface light source device and a display provided with the same of an embodiment in accordance With the present invention.

An embodiment of the present invention is described in detail below.

<Outlined Structure of Surface Light Source Device and Image Display Employing the Same>

Referring to FIGS. 1 to 3b, image display 1 comprises LCD panel (member to be illuminated member) 3 and surface light source device 2 for backlighting the same. Surface light source device 2 is provided with light guide plate 4, a plurality of LEDs (light emitting diodes) 6, light reflection member 8 and light control member 11. Incidence face 5 is provided by a minor face of light guide plate 4. A plurality of LEDs 6 provide a primary light source, supplying light (primary light) toward incidence face 5. A major face of light guide plate 4 provides emission face 10, along which light control member 11 is disposed. Another major face provides back face 7, along which light reflection member 8 is disposed. XYZ-coordinate system illustrated therein is a coordinate system for expressing directions and planes according to the following definitions.

(1) A normal direction (directed to light emission side) of emission face 10 is defined as +Z-direction.

(2) A direction of light supply (directed toward incidence face 5 light from primary light source 6) is defined as +Y-direction.

(3) An extending direction of a side end face providing incidence face 5 is defined as ±X-direction. As to signs, the left side corresponds to +X-direction and the right side corresponds to −X-direction, as viewed −Y side (LED 6 side). Light from LEDs 6 propagates within light guide plate 4 after entering into light guide plate 4 through incidence face 5. This inner propagation involves inner incidences to emission face 10, causing light which has an inner incidence angle not greater than a critical angle to be emitted from emission face 10. As known well, this emission is an oblique emission. Obliquely emitted light is deflected by light control member 11 as to come near to a normal direction (+Z-direction) of emission face 10.

Light guide plate 4 is made of a light permeable material such as polymethyl methacrylate (PMMA), polycarbonate (PC) or cycloolefin-type resin. Light guide plate 4 has a generally rectangular plan shape, being decreasing in thickness according to an increasing distance from incidence face 5 (along Y-direction). That is, back face 7 is inclined at a small angle with respect to emission face 10, in other words, with respect to XY-plane, as shown in FIG. 3a with denotation of angle α expressing this inclination.

Figure 2B:
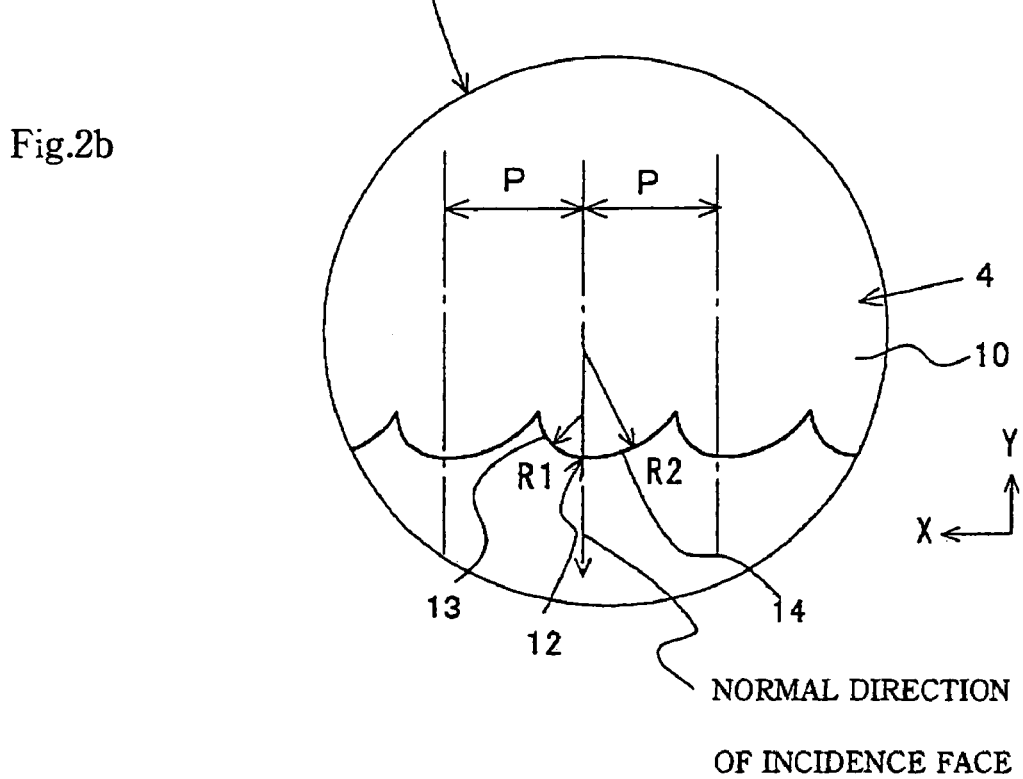
Figure 3:
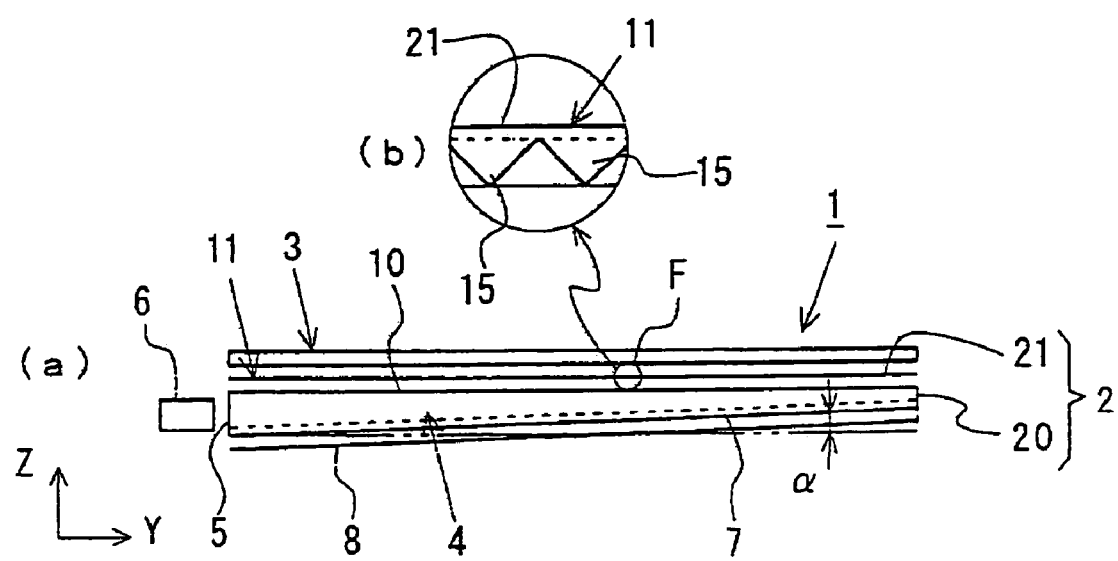

In addition, many incidence control portions 12 running in a direction of light guide plate thickness are formed on incidence face 5, as shown in FIG. 1d and FIG. 2b. In this embodiment, each incidence control portion 12 provides a projection portion. Each projection portion consists of a left-hand part (first part) and a right-hand part (second part) as viewed from −Y-side (i.e. the side of primary light source 6).

It is noted that a side face (a part of incidence face 5) provided by the first part is called "first side face" and another side face (another part of incidence face 5) provided by the second part is called "second side face".

Reference numeral 13 denotes an edge (upper edge of the first side face) that is seen when the first side face)the is observed from +Z-side, and reference numeral 14 denotes an edge (upper edge of the second side face) that is seen when the second side face) the is observed from +Z-side. It is noted that first and second edges 13, 14 represent the first and second side faces, respectively, and wording such as side face 13 or side face 14 is employed in the description hereafter. Light control member 11 is a film-like optical element, being made of light well-permeable resin material (such as polyethylene terephthalate (PET), PMMA or PC).

As shown in FIGS. 1a and 2a, light control member 11 has a rectangular plan shape generally the same as that of emission face 10 of light guide plate 4. Many prismatic projection rows 15 are formed on −Z-side (side directed to emission face 10, namely, light input side).

Each prismatic projection row 15 has a triangle-like cross section, functioning as to cause the emission from emission face 10 to be redirected to directions near to a normal direction (+Z-direction) of emission face 10.

Viewed from +Z-side, first side face (convex face) 13 draws a curved line (profile line) of curvature radius R1 and second side face (convex face) 14 draws a curved line (profile line) having of curvature radius R2. Side faces 13 and 14 are connected smoothly to each other, and accordingly, both curved lines (profile lines) are connected smoothly to each other, too. A boundary line between side faces 13 and 14 exists on a line running in ±Z-direction.

Thus each incidence control portion 12 has an asymmetrical configuration with respect to a YZ-plane passing the boundary line between side faces 13 and 14 (extending in ±Z-direction). On the other hand, Prismatic projection rows 15 of light control member 11 run in an oblique direction inclined with respect to ±X-direction. Angle of this inclination is denoted by θ in FIG. 2a.

Angle θ is determined generally within a range $0° < \theta \leq 45°$ under consideration of avoiding Moire pattern on being combined with LCD-panel 3, usually falling within a range $0° < \theta \leq 30°$, or especially preferable range $3° < \theta \leq 30°$.

It should be noted that an inclination direction of projection rows 15 is inclined either "clockwise" or "anticlockwise", as viewed from +Z-side (side of display panel 3).

In the illustrated case, "anticlockwise" inclination is employed, as shown in FIG. 2a. Projection rows 15 inclined anticlockwise get more distant from incidence face 5 as they extends from the left-hand-side (+X-side, i.e. the side of side end face 16) toward the right-hand-side (−X-side, i.e. the side of side end face 17), as viewed from the side of LED (primary light source) 6.

If projection rows 15 are inclined "clockwise" contrariwise (under $0° < \theta \leq 30°$ with respect to an extending direction of incidence face 5), projection rows 15 get more distant from incidence face 5 as they extends toward the left-hand-side (+X-side), as viewed from the side of LED (primary light source) 6.

Which of curvature radii R1 and R2 is greater than the other is determined depending on direction of inclination (clockwise/anticlockwise). If an inclination of being inclined "anticlockwise" is employed as the instant case, R1<R2. If an inclination of being inclined "clockwise" is employed, R1>R2.

Exemplary values pitch of p of incidence control portions 12 adjacent to each other and curvature radii R1, R2 are as follows.

p=about 100 μm
R1=about 100 μm
R2=about 200 μm

Generally saying, values of p, R1 and R2 are preferably determined depending on various design conditions such as size of light guide plate 4, configuration and size of incidence control portions 12 or angle θ of projection rows 15 of light control member 11.

Many prismatic projection rows 18 is formed on back face 7 of light guide plate 4, running in a direction generally perpendicular to incidence face 5. Each of projection rows 18 extends from incidence face 5 to an opposite side end face 20. Projection rows 18 provides an emission-directivity-giving-means.

That is, projection rows 18 inner-reflect and deflect light from LEDs 6 as to cause the light to come near to a normal direction of emission face 10 in a plane which is parallel to incidence face 5 and perpendicular to emission face 10.

It is noted that any emission-directivity-giving-means other than the above-described projection rows 18 may be employed so far as that gives a directivity to an inner propagation light within light guide plate 4 so that a directivity of emission from emission face 10 is modified to a desirable directivity.

For example, an employable emission-directivity-giving means is provided by prismatic projection rows running in a direction generally perpendicular to incidence face 5 on emission face 10. Another employable emission-directivity-giving means is provided by prismatic projection rows running in a direction generally perpendicular to incidence face 5 on both back face 7 and emission face 10.

Alternatively, an emission-directivity-giving means may be provided by surface(s) which is(are) formed on back face 7 and/or emission face 10 of light guide plate 4 and roughened to a degree such that emission from emission face 10 keeps a desirable emission-directivity.

Still alternatively, an emission-directivity-giving means may be provided by emission-promotion-pattern formed on back face 7 and/or emission face 10 of light guide plate 4. This emission-promotion-pattern is formed in a manner such that emission from emission face 10 keeps a desirable emission-directivity.

It is noted that emission-promotion-pattern may be hemisphere-like, pyramid-like or cone-like projections or recesses. Further still another emission-directivity-giving means may be provided by a great number of scattering elements dispersed within light guide plate 4 at a density of a degree such that emission-directivity is not disturbed.

The scattering elements scatter inner-scatter light, resulting in emission with an emission-directivity. It is noted that "emission with a directivity" means that emission occurs from light guide plate 4 preferentially toward a particular emission angle direction and around the same without being randomly diffused, and "emission-directivity" means characteristics causing such emission.

Light reflection member 8 is a sheet-like member having a regular or irregular reflectivity, functioning as to return light leaked through back face 7 of light guide plate 4 into light guide plate 4. It is noted that light reflection member 8 may be omitted in a case where housing (not shown) accommodating members including light guide plate 4 has a light reflective inner surface (such as white surface).

Operation of Embodiment

FIG. 4*a* is a diagram illustrating the state of light outputted from light control member 11 of surface light source device 2 described above and FIG. 4*b* is a plan view diagram illustrating light emitted from LED 6. FIG. 4*c* is a diagrammatic plan view of emission from light guide plate 4 as viewed from +Z-side. It is noted that unevenness configuration of a control portion formed on an incidence face of the light guide plate is omitted in the illustration for the sake of convenience.

As shown in FIG. 4*b*, emission light from LED 6 has a directivity diverging like a sector.

Diverging angle of sector is denoted by δ1. It is noted that diverging angle of sector can be defined as "angle made between two directions which give a 50% intensity (half value) of the maximum intensity at both sides of a light-travelling-direction giving the maximum intensity".

As shown in FIG. 4*b*, this sectorial light (primary light) enters into the light guide plate through the incidence face, being refracted at the above-described first and second sides of incidence control portion 12 as to have a broadened travelling direction range. That is, diverging angle δ1 of the light flux before the incidence to the light guide plate changes to δ2 of the light flux after the incidence (δ1<δ2). In other words, the incidence through incidence control portion 12 produces a sectorial inner propagation light having diverging angle δ2 on XY-plane.

It is noted that incidence control portion 12 provides convex first side face 13 of curvature radius R1 that is smaller than curvature radius R2 of second side face 14 provided by the same, as shown in FIG. 2. Therefore right-side-end L1 and left-side-end L2 of the sector-like light flux are deviated to the incidence face side (−X-side) as compared with those before the incidence to the light guide plate, as shown in FIG. 4*c*. In other words, a center axis direction of sector expressing diverging range of inner propagation light is inclined "clockwise" from +Y-direction as viewed from +Z-side. Angle of this inclination is denoted by β in FIG. 4*c*.

Such generation of inner propagation light inclined "clockwise" corresponds to a fact that prismatic projection rows 15 of light control member 11 extend obliquely "anti-clockwise".

Figure 5:
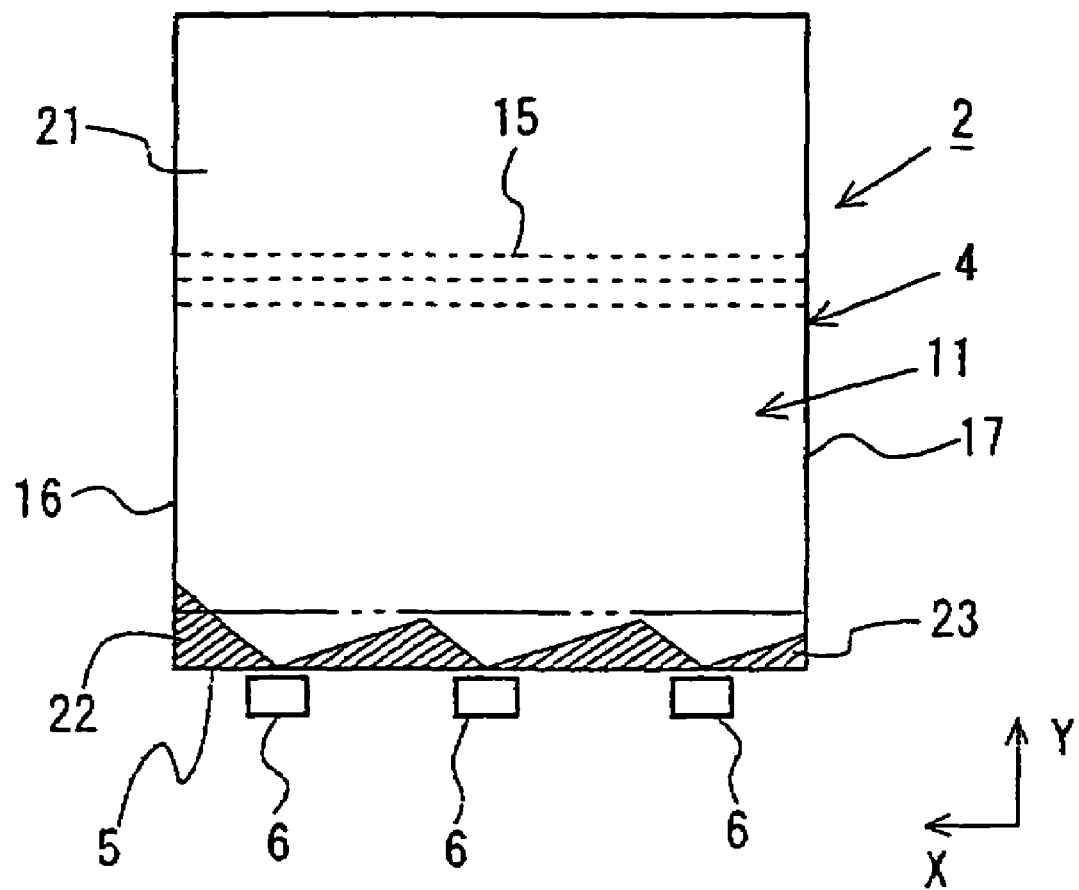

An advantage is obtained by utilizing such correspondence relation. FIG. 5 shows an example for comparison to understand this.

In this example for comparison, the above-described incidence control portion 12 is maintained without being changed while prismatic projection rows 15 of light control member 11 extend in a changed direction which is parallel to incidence face 5 (±X-direction). In this case, hatched areas on outputting face (flat face) 21 look dark as viewed from +Z-side.

It is to be noted that dark areas 22, 23 appear asymmetrically at the right-hand and left-hand corner portions differently in size from each other. In the illustrated case, dark area 22>dark area 23. This is caused by a fact that an inner propagation light is urged to be inclined "clockwise" in the device by incidence control portion 12 employed in the example for comparison. Such right-left-unbalanced appearance of dark areas gives unnatural sight feeling, being undesirable.

On the other hand, so far as brightness of emission face 10 is concerned, the left-hand corner portion in the embodiment is subject to reduction as compared with the tight-hand corner portion. This is understood from a hatched area (dark area) in FIG. 4*c*.

However, this reduction in bright in the embodiment can be relaxed by a fact that prismatic projection rows 15 of light control member 11 run in a direction inclined anticlockwise by angle θ according to the above-described correspondence relation. The reason is as follows.

Now provided is that light emitted from emission face 10 is inputted to light control member 11 under a condition such that emission face 10 gives a reduced brightness in the vicinity of the left-hand corner portion as compared with the vicinity of the right-hand corner portion, as illustrated in FIG. 4*c*.

In this case, the light travels through prismatic projection rows 15 inclined anticlockwise, being deflected somewhat to a left-hand-direction in FIG. 4*a*. As a result, dark areas 22, 23 become dark areas which appear at both sides of output face 21 of light control member 11 generally symmetrically (like triangles) and have approximately the same size, as shown in FIG. 4*a*. This causes unbalanced in brightness the above example comparison involves to be overcome.

In addition, since prismatic projection rows 15 of light control member 11 run obliquely (at inclination angle θ), LCD panel 3 can have a image display screen free from Moire pattern.

Further, according to the embodiment, light control portion (convex portion) 12 formed on incidence face 5 of light guide plate 4 causes a light flux of LED 6 to be diverged angularly on entering into light guide plate 4, with the result that sizes of dark area 22, 23 appearing in the vicinity of the incidence face are reduced and effective light emitting area (providing illumination light effectively used) of emission face 10 is enlarged.

Needless to say, effects like those described above are also obtained if the above combination in the embodiment consisting of "prismatic projection rows 15 running in a direction inclined anticlockwise" and "generation of a sector-like diverging inner propagation light inclined clockwise" is replaced by another combination consisting of "prismatic projection rows 15 running in a direction inclined clockwise" and "generation of a sector-like diverging inner propagation light inclined anticlockwise".

For example, if configurations (curved surfaces) of side faces 13 and 14 of incidence control portion 12 are exchanged, "generation of a sector-like diverging inner propagation light inclined anticlockwise" is realized. In other words, R1>R2 employed instead of R1<R2 gives an enough condition.

Figure 6A:
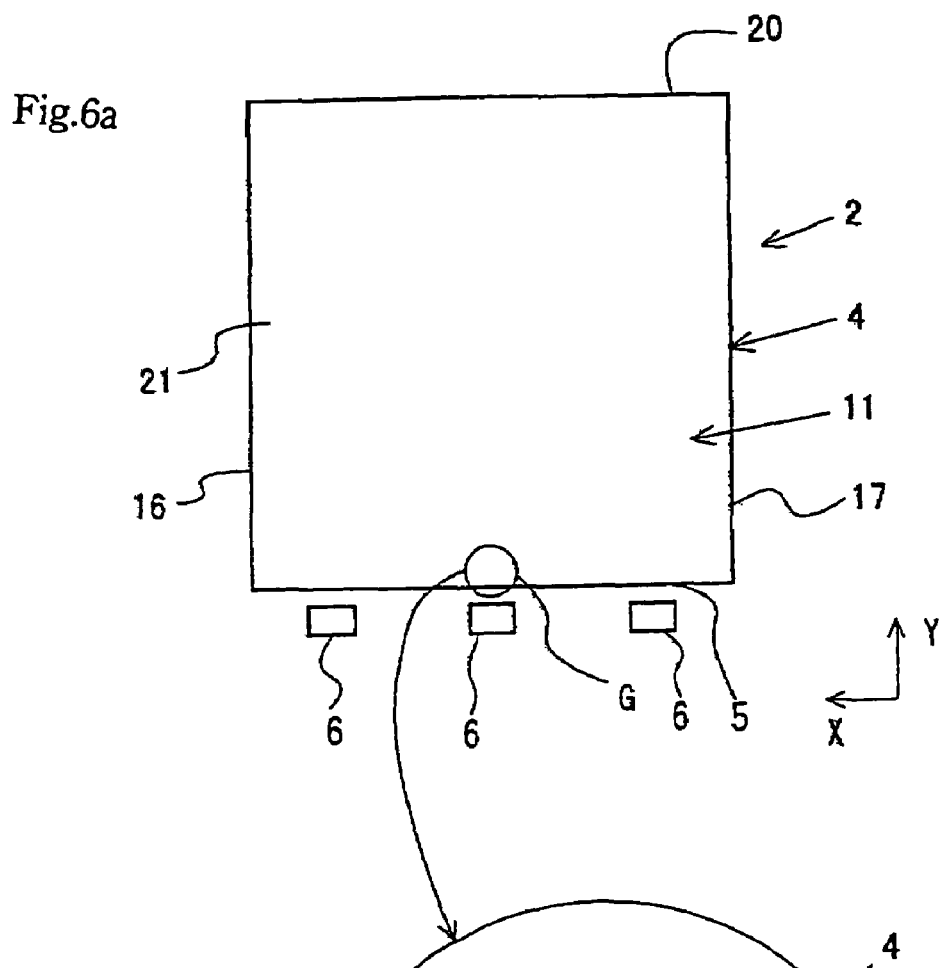
FIG. 6a is a plan view of a surface light source device of another example for comparison.
Figure 6B:
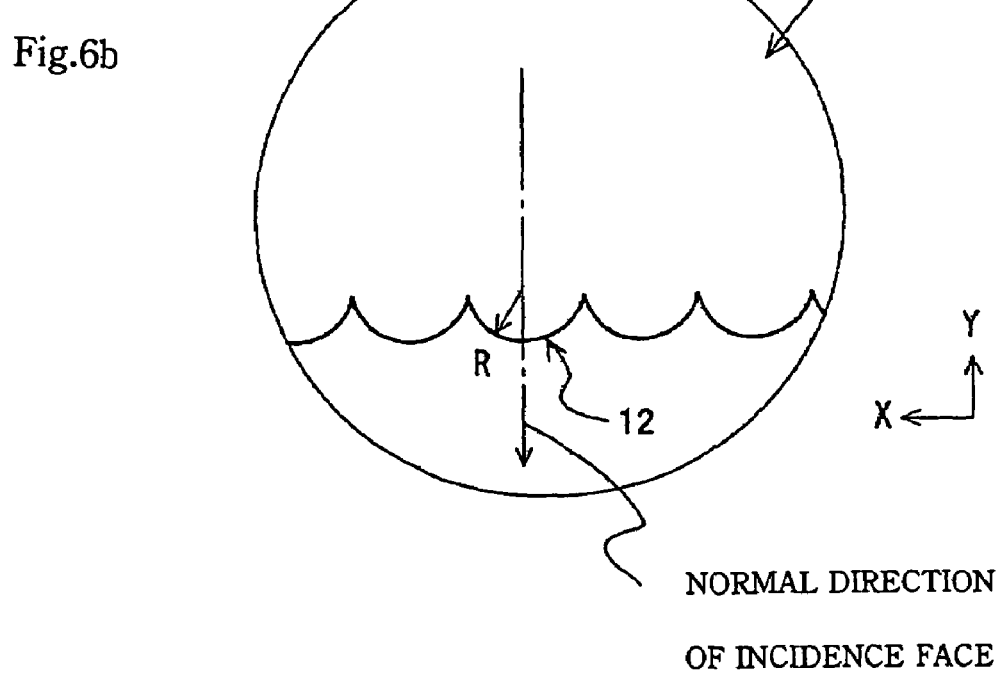
Figure 7:
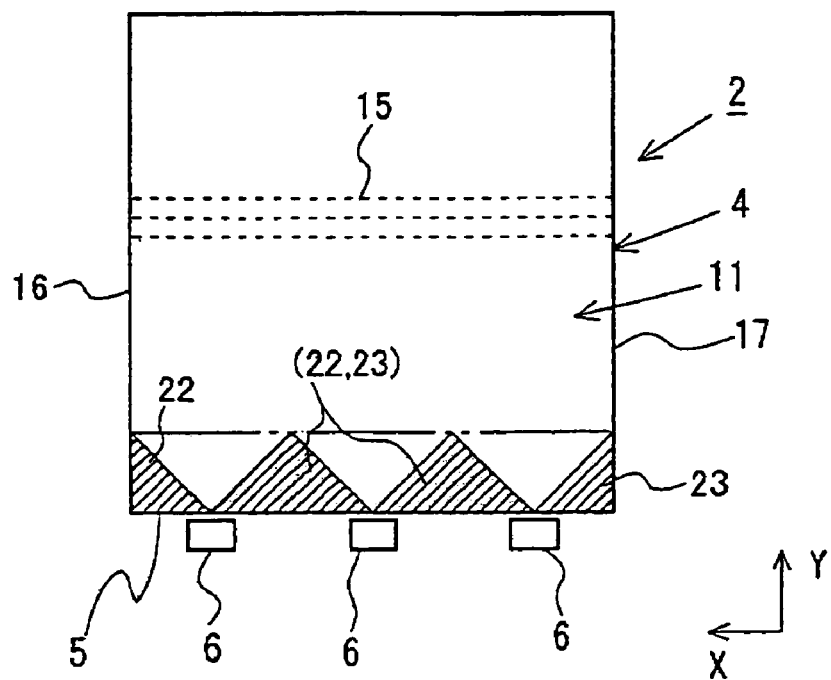
FIG. 7 is a plan view diagram illustrating an appearance manner of dark areas in a case of the example for comparison in connection with FIG. 6a in which prismatic projection rows of a light control member run parallel to an incidence face of a light guide plate.

In the next place, an example for comparison shown in FIGS. 6 and 7 is described. FIG. 6*a* is a plan view of a surface light source device of another example for comparison and FIG. 6*b* is a partially enlarged view of part G shown in FIG. 6*a*.

FIG. 7 is a plan view diagram illustrating an appearance manner of dark areas in a case of the example for comparison shown in FIG. 6*a* in which prismatic projection rows of a light control member run parallel to an incidence face of a light guide plate.

Figure 8:
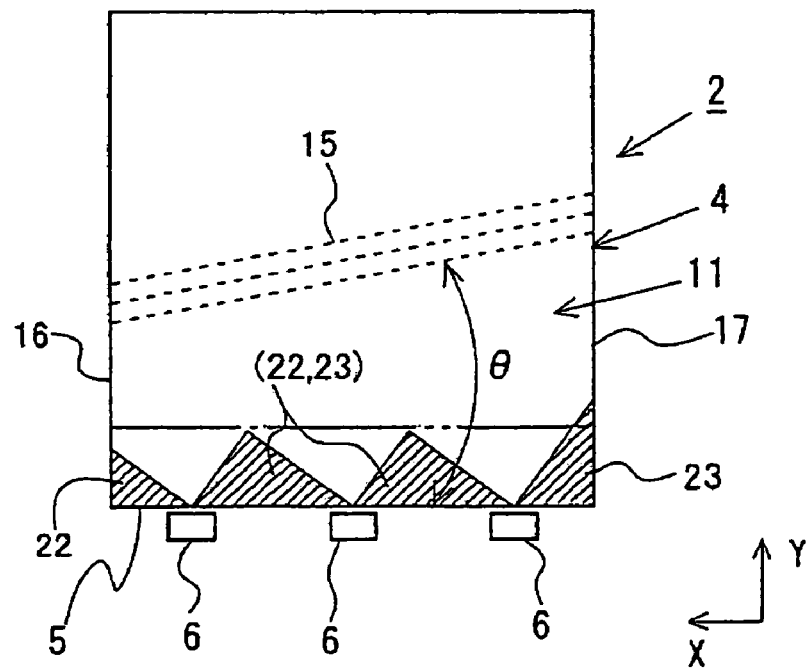
FIG. 8 is a plan view diagram illustrating an appearance manner of dark areas in a case of the surface light source device shown in FIG. 6a in which prismatic projection rows of the light control member run obliquely at inclination angle θ with respect to an incidence face of a light guide plate.

In addition, FIG. 8 is a plan view diagram illustrating an appearance manner of dark areas in a case of the surface light source device shown in FIG. 6*a* in which prismatic projection rows of the light control member run obliquely at inclination angle θ with respect to an incidence face of a light guide plate.

In the arrangement shown in FIG. 7, incidence control portion 12 formed on incidence face 5 of light guide plate 4 gives a simple cylindrical surface with curvature radius R while prismatic projection rows 15 of light control member 11 run in parallel to incidence face 5 (in ±X-direction). In this case, light outputted from light control member 11 gives dark areas (hatched areas) 22, 23 at both sides symmetrically. However, LCD panel 3 can not prevent Moire patten effectively from appearing because prismatic projection rows run in parallel to incidence face 5.

On the other hand, the arrangement shown in FIG. 8 enables LCD panel 3 to prevent Moire patten effectively from appearing, but dark areas (hatched areas) 22, 23 are formed asymmetrically.

As discussed already, this phenomenon causes dark areas 22, 23 appearing respectively around corners respectively corresponding to the right-hand and left-hand ends of incidence face 5 to be different in size, leading to unbalance in brightness. In addition, the greater dark area 23 causes the light guide plate to have a narrowed effective light emitting area.

Modifications of Embodiment (First Modification)

Figure 9A:
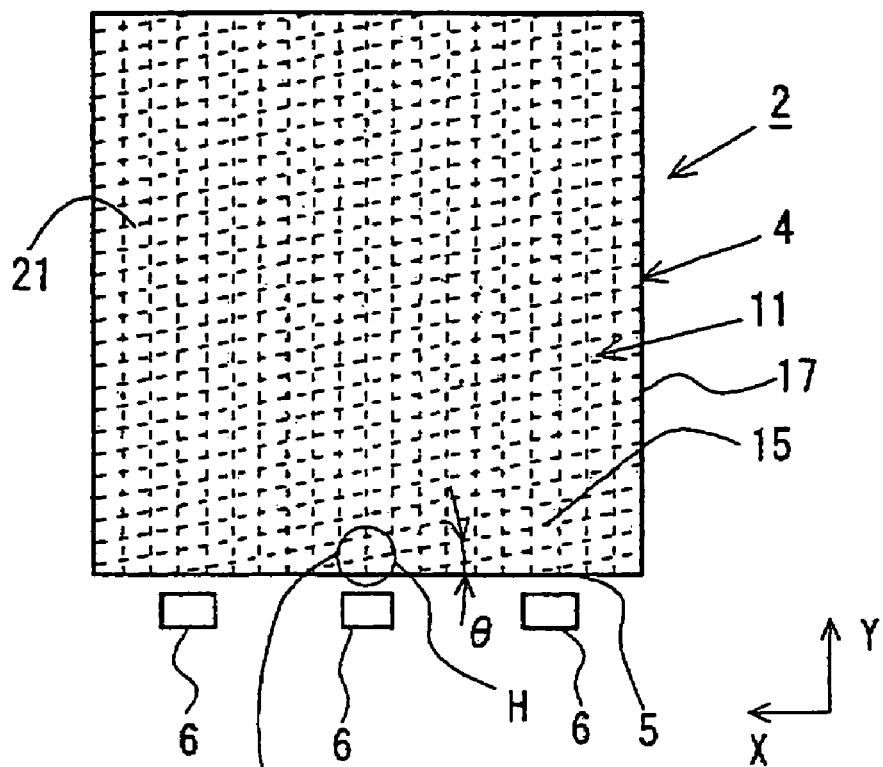
FIG. 9a is a plan view illustrating a surface light source device in accordance with a first modification of the present invention.
Figure 9B:
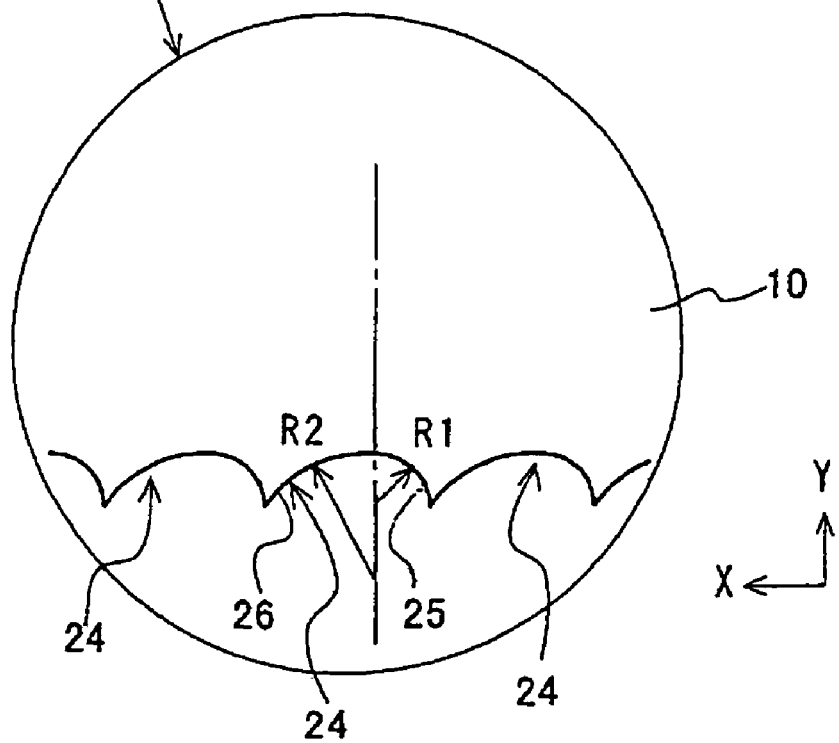

FIGS. 9*a*, 9*b* illustrate a first modification of the above-described embodiment in corresponding to FIG. 2. Incidence control portion 24 shown in FIG. 9*b* gives configurations like recesses formed at a plurality of locations on incidence face 5 of light guide plate 4.

Each incidence control portion 24 provides a first side (curved surface) 25 giving a curved line (profile) with curvature radius R1 as viewed from +Z-direction side and a second side (curved surface) 26 giving a curved line (profile) with curvature radius R2 as viewed from +Z-direction side.

Both curved surfaces 25, 26 are shaped like recesses and R1<R2. Curvature centers of curved surfaces 25, 26 are located on −Y-side (LED 6 side) with respect to incidence face 5. Curved surfaces 25, 26 are connected to each other smoothly and the above curved lines (profiles) are connected to each other correspondingly.

Boundary between curved surfaces 25, 26 is located on a line running in ±Z-direction. Thus each incidence control portion 24 is also configurated asymmetrically with respect to YZ-plane passing the boundary line (running in ±Z-direction) between first and second side faces 25.

If prismatic projection rows 15 of light control member 11 run in a direction inclined "anticlockwise" at inclination angle θ with respect to ±X-direction as shown in FIG. 9*a*, first curved surface 25 is located at the right-hand second curved surface 26 is located at the left-hand as shown in FIG. 9*b*.

Under such an arrangement, refraction effects like that of the foresaid case are performed by incidence control portions 24, with the result that an "inner propagation light inclined anticlockwise" (See FIG. 4*c*) is produced. A combination of this inner propagation light and "prismatic projection rows 15 running in a direction inclined anticlockwise" brings advantages like those of the above-described embodiment.

It is noted that incidence control portions have changed recess configurations such that first curved surface 25 is located at the left-hand and second curved surface 26 is located at the right-hand if prismatic projection rows 15 of light control member 11 run in a direction inclined "clockwise" at inclination angle θ.

(Second Modification)

Figure 10:
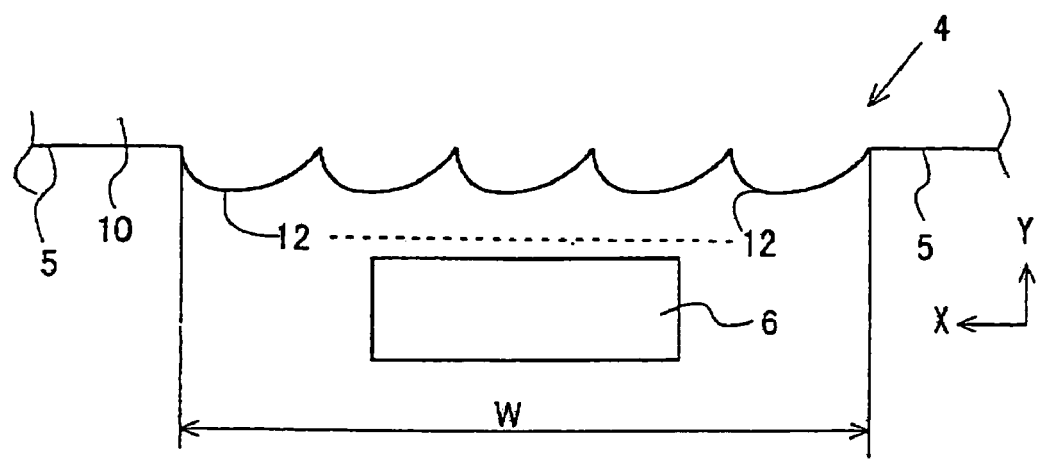
FIG. 10 is a partially enlarged view of an incidence face and around the same of a light guide plate in accordance with a second modification of the present invention.

FIG. 10 illustrates a second modification of the above-described embodiment, giving a partially enlarged plan illustration of incidence face 5 of light guide plate 4 and around the same as viewed from a normal direction of emission face 10 (from +Z-side).

In this modification, a plurality of projecting portions providing incidence control portions 12 are formed in a limited range W on incidence face. Areas without being occupied by incidence control portion 12 (a part of incidence face 5) are flat surfaces.

Each incidence control portion 12 may have a configuration the same as that employed in the above-described embodiment. Since relation with respect to an oblique running direction of projection rows of light control member 11 is the same as that described above, repeated descriptions are omitted.

A plurality of LEDs 6 are disposed so that incidence control portion 12 having width W is supplied with light sufficiently. Distance between LEDs 6 and incidence face 5 is preferably small.

A combination of "inner propagation light inclined clockwise (or anticlockwise)" produced by refraction effect of each incidence control portions 12 and "projection rows 15 running in a direction inclined anticlockwise (or clockwise)" brings advantages like those of the above-described embodiment.

(Third Modification)

Figure 11:
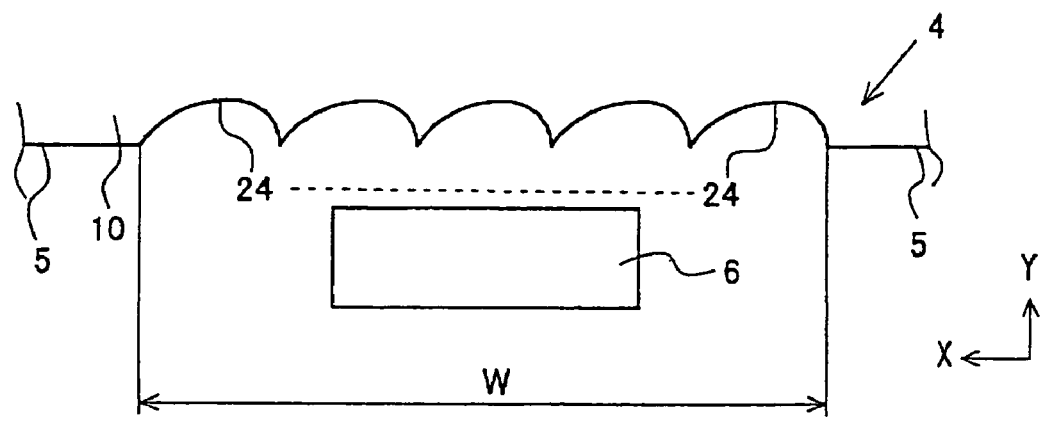
FIG. 11 is a partially enlarged view of an incidence face and around the same of a light guide plate in accordance with a third modification of the present invention.
Figure 16A:
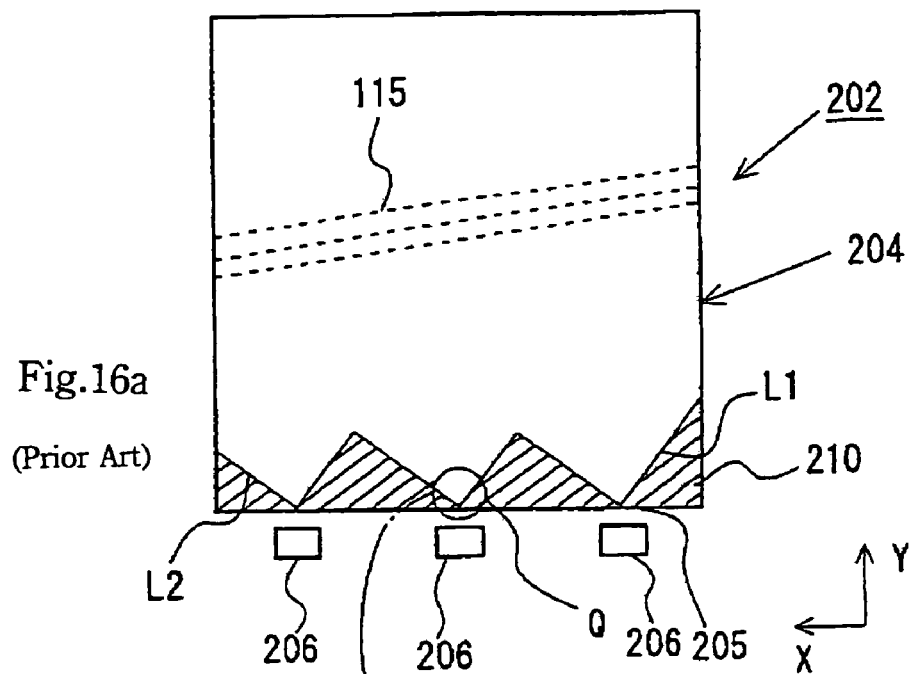
Figure 16B:
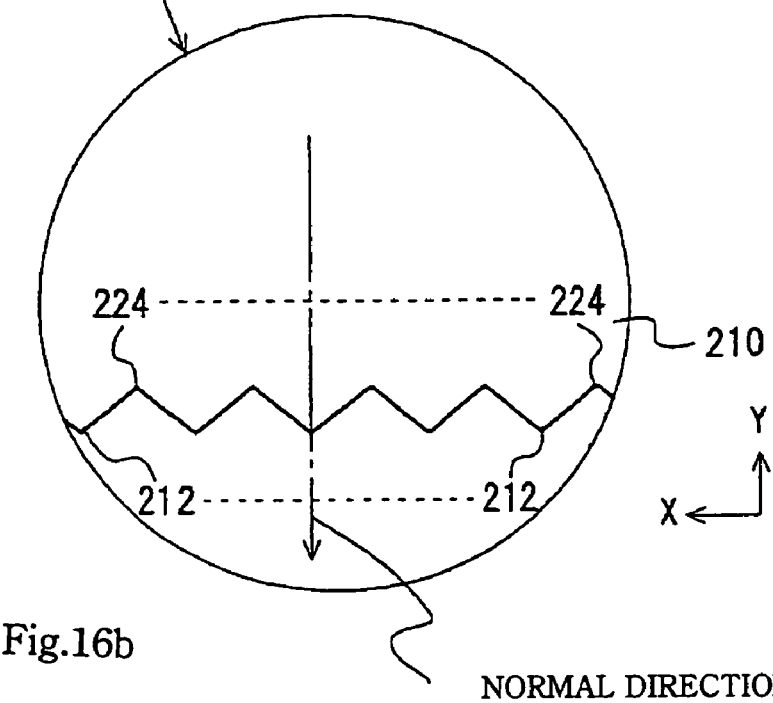

FIG. 11 illustrates a third modification which is obtained by further modifying the above-described first modification, giving a partially enlarged plan illustration of incidence face 5 of light guide plate 4 and around the same as viewed from +Z-side.

In this modification, incidence control portions 24 are formed like recesses. A plurality of incidence control portions 24 are formed in a limited range W on incidence face. Areas without being occupied by incidence control portion 24 (a part of incidence face 5) are flat surfaces. Each incidence control portion 24 has a configuration and functions about which has been described already with referring to FIG. 9b.

Since relation with respect to an oblique running direction of projection rows of the light control member is the same as that described above, repeated descriptions are omitted.

A plurality of LEDs 6 are disposed so that incidence control portion 24 having width W is supplied with light sufficiently. Distance between LEDs 6 and incidence face 5 is preferably small.

(Forth Modification)

FIG. 12 illustrates a forth modification of above-described embodiment, giving a partially enlarged plan illustration of incidence face 5 of light guide plate 4 and around the same as viewed from +Z-side.

In this modification, a plurality of incidence control portions 12 are formed on incidence face. Each incidence control portion 12 has an asymmetric configuration the same as that employed in the fore-described embodiment. LEDs 6 are disposed at locations corresponding to incidence control portions 12, respectively, in one-to-one correspondence.

Such an arrangement also causes light entering onto light guide plate 4 through each incidence control portion 12 to produces an "inner propagation light inclined clockwise (or anticlockwise)" in generally the same ways as those in the foresaid embodiment.

Therefore advantages like those of the above-described embodiment are obtained by combining with "projection rows 15 running in a direction inclined anticlockwise (or clockwise)", as explained previously.

(Fifth Modification)

FIG. 13 illustrates a fifth modification of above-described embodiment, giving a partially enlarged plan illustration of incidence face 5 of light guide plate 4 and around the same as viewed from +Z-side.

In this modification, a plurality of incidence control portions 24 are formed on incidence face. Each incidence control portion 24 has a projection-recess configuration the same as that shown in FIG. 9b. LEDs 6 are disposed at locations corresponding to incidence control portions 12, respectively, in one-to-one correspondence.

Such an arrangement also causes light entering onto light guide plate 4 through each incidence control portion 12 to produces an "inner propagation light inclined clockwise (or anticlockwise)" in generally the same ways as those in the foresaid embodiment.

Therefore advantages like those of the above-described embodiment are obtained by combining with "projection rows 15 running in a direction inclined anticlockwise (or clockwise)", as explained previously.

It is noted that first and second side faces 13, 14 or 25, 26 are connected to each other directly. However, this does not limit the scope of the present invention.

For instance, a third curved surface, not shown, may be interposed between first and second side faces 13, 14 or 25, 26.

In this case, "boundary line between first and second side faces" is regarded as "center line running in ±Z-direction on the third surface".

Further, both or one of first and second side faces may be formed of flat surfaces, or alternately one of them may be formed if a flat surface and the other of a curved surface.

What is claimed is:

1. A surface light source device comprising:
a light guide plate, a primary light source performing light supply to said light guide plate sideways and light control member,
said light guide plate having an emission face provided by a major face and an incidence face provided by a side end face extending in a right-and-left direction as viewed from the primary light source;
said light control member being disposed along the emission face and deflecting a proceeding direction of light emitted from the emission face as to let the proceeding direction come near to a normal direction of the emission face,
wherein said light guide plate is provided with an emission-directivity-giving-means giving a directivity to an inner propagation light within the light guide plate so that directivity of emission from the emission face is modified,
and, under definition that the normal direction of the emission face is +Z-direction and a direction of said light supply is +Y-direction and an extending direction of said side end face is ±X-direction, said light control member is provided a plurality of prismatic projection rows running in an oblique direction inclined clockwise or anticlockwise with respect to ±X-direction as viewed from +Z-direction side while said incidence face is provided with a plurality of incidence control portions each of which has first and second parts providing first and second side faces extending in ±Z-direction, the first side face being left-hand-located and the second side face being right-hand-located as vied from −Y-direction side,
and each of the incidence control portions is further configurated asymmetrically with respect to a plane which is perpendicular to ±X-direction and passes a boundary line between said first and second side faces,
thereby causing an inner propagation light generated when light emitted from said primary light source enters into said light guide plate through each of said incidence control portions to have a sector-like spread, in a plane parallel to said emission face, which has a center axis inclined, with respect to +Y-direction, either anticlockwise under a condition that said oblique direction is inclined clockwise or clockwise under another condition that said oblique direction is inclined anticlockwise.

2. A surface light source device according to claim 1, wherein said first and second side faces are curved faces different from each other in curvature.

3. A surface light source device according to claim 1, wherein said first and second side faces are flat faces inclined at different inclination angles with respect to ±X-direction.

4. A surface light source device according to claim 1, wherein one of said first and second side faces is a curved face and the other is a flat face.

5. A display comprising a surface light source device and an member irradiated by output light of the surface light source device, wherein the surface light source device is according to claim 1, 2, 3 or 4.

* * * * *